March 3, 1970  KAZUO YASUNAMI  3,498,142
FLUID PRESSURE MEASURING DEVICE
Original Filed July 19, 1965  2 Sheets-Sheet 2
Fig. 4
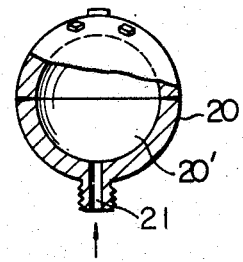
Fig. 5
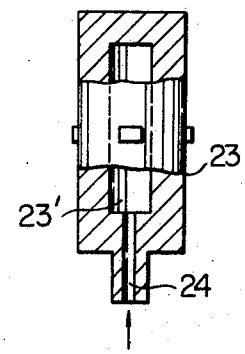
Fig. 6
Fig. 7
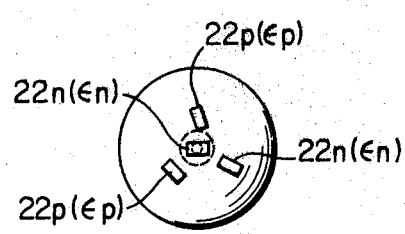
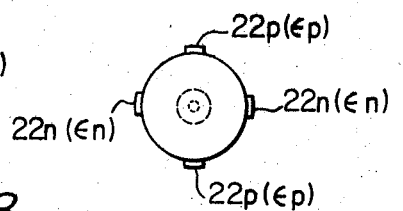
Fig. 8
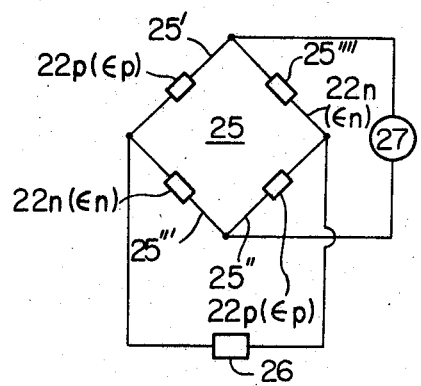
INVENTOR.
KAZUO YASUNAMI.
BY
ATTORNEY.

United States Patent Office 3,498,142
Patented Mar. 3, 1970

3,498,142
FLUID PRESSURE MEASURING DEVICE
Kazuo Yasunami, Ashiya-shi, Japan, assignor to Kobe Steel Ltd., Fukiai-ku, Kobe, Japan
Continuation of application Ser. No. 472,762, July 19, 1965. This application Jan. 16, 1968, Ser. No. 698,357
Claims priority, application Japan, July 24, 1964, 39/41,728
Int. Cl. G01l 9/00
U.S. Cl. 73—398                3 Claims

ABSTRACT OF THE DISCLOSURE

A fluid pressure measuring device comprising in combination: a vessel, said vessel being made of a material having a thickness, shape and tensile and a compressive elastic strength capable to withstand given limits of pressure strains; said vessel forming a pressure receiving chamber with at least a portion of its wall symmetrically curved to provide equality of its actual strain-pressure relationship with its theoretically determined strain-pressure relationship, means to introduce fluid into said vessel under pressures within said given limits; means to detect the strain produced by the pressures of the introduced fluid, a bridge circuit comprising a set of at least one pair of complementary semiconductor strain gauges spaced on the walls of said vessel to detect said strains as a resistance change; a voltage source and a voltmeter, whereby said gauges change their characteristic parameters in consequence of changes of strains in the walls of said chamber, the changes of the parameters of said gauges resulting in voltage changes in the output of said bridge, said voltage changes being detected with said voltmeter.

Background of the invention

The present application is a streamlined continuation of U.S. application Ser. No. 472,762, now abandoned and the filing date of July 19, 1965, thereof, as well as the filing date of the prior corresponding Japanese application No. 39/41,728 of July 24, 1964, are claimed herewith.

The present invention relates to a method for measuring the pressures on fluids, and more particularly relates to a novel method for measuring the pressures on fluids with the use of semiconductor elements. Generally the present invention is to provide a novel method for measuring the pressure on a fluid which comprises the steps of introducing a pressurized fluid into a pressure sensitive vessel so as to develop a strain or strains in the wall or walls of the vessel coresponding to the magnitude of the fluid pressure applied on the vessel, converting the thus developed strain or strains into an electric quantity or quantities representing the strain magnitude or magnitudes by means of a plurality of semiconductor elements disposed on the wall or walls of the vessel, and indicating the thus converted electric quantity or quantities by means of a voltmeter whereby the pressure on the fluid may be determined by reading the value or values indicated in the graduation of the voltmeter. The present invention is also to provide a simple means by which the novel method may be efficiently carried out and the pressures on a fluid can be easily determined thereby.

There has been heretofore proposed the so-called Bourdon gauge as a means for measuring fluid pressures, and such a means has been widely employed for the purpose, but this type pressure gauge utilizes the sensed fluid pressure as the driving energy for mechanically actuating its own pointer without converting the fluid pressure into any other form of driving energy. Accordingly, in such the pressure gauge a fluid whose pressure is to be measured has to be maintained in the gauge continuously. Therefore, the Bourdon gauge has the inherent disadvantages that it is not suitable as an automatically controlled measuring means or remote control measuring means, and that it magnifies small pulsations in a fluid pressure being measured, resulting in fluctuations of the gauge pointer which makes the indication unreliable. In addition, in the Bourdon gauge the range of pressures that can be accurately measured is narrowly restricted. Various other types of pressure measuring means have also been proposed, but these prior art means also have inherent disadvantages in that they are expensive and/or lacking in flexibility.

Summary of the invention

The novel fluid pressure measuring method of the present invention can be easily carried out by the use of a very simple device comprised of a combination of a pressure sensitive vessel having a plurality of strain sensing semiconductor elements disposed on its wall or walls, and a voltmeter. According to this novel method, the pressure in a fluid is measured by converting the strain or strains which develop in the wall or walls of a vessel containing the fluid into an electrical quantity or quantities corresponding to the magnitude of the thus developed strain or strains by means of a plurality semiconductor elements disposed on the wall or walls of the vessel. Accordingly, by extending the lead wire it is quite easy to dispose a pressure indicating means which cooperates with the vessel at a location remote from the pressure supply source, and the indication and recording by the indicating means may become more accurate. Therefore, the novel method can be conveniently utilized for both automatic controlled measuring and remote control measuring operations. When materials for the strain sensitive semiconductor elements are suitably selected and the positions of these elements in the vessel are also suitably selected, both the relationship between the pressure of the fluid and the resulting elastic strains and the relationship between the elastic strains and the resulting changes in electric resistance of the elements can be so determined that the novel measuring method can easily measure fluid pressures without requiring any troublesome experimental calibration curves. In addition, a wide range of pressures ranging from several tens to tens of thousands of atmospheres can be easily measured, whether static or dynamic. Furthermore, since the only necessary electric source is a dry battery, the present invention can provide a simple portable pressure gauge. The portable pressure gauge of this invention can be manufactured as cheaply as a conventional Bourdon gauge of corresponding capacity, thus providing a more practical and more versatile pressure measuring means at the same or lower cost.

In fabricating pressure sensitive vessels suitable for carrying out the novel method, the materials and arrangement of such vessels must be so selected that the relationship between the fluid pressures to be measured and the corresponding strains, within the elastic limits, of the vessels correspond to theoretically calculated values. When vessels which satisfy these conditions are used, the relations between fluid pressures and trains in the vessels become imple linear proportional relations and can indicate fluid pressures by the use of an equally divided graduation means without the necessity of use of the so-called calibration curves.

Generally, two types of strains such as expansive strains (positive strains) and compressive strains (negative strains) take place in the pressure sensitive vessels employed for the purpose of the present invention and the semiconductor elements or gauges which may be useful in the present invention include p-type and n-type semiconductor elements. In this novel method, by selecting suitable types of strains and semiconductor elements and combining the selected strains and semiconductor elements with suitable bridge circuits, a precise fluid pressure measuring method is provided whereby pressures on fluids can be determined in terms of magnified strain magnitudes.

Brief description of the drawings

The above and other objects and advantages of the present invention will be more readily apparent from the following description when read in connection with the accompanying drawings in which:

FIG. 4 is an elevation view of a further modified form of device employing two different types of semiconductor elements and which shows a portion thereof in section;

FIG. 5 is a view similar to FIG. 4, but shows a further more modified form of device employing the same two types of semiconductor elements as those employed in the device of FIG. 6;

FIG. 6 is a top plan view of the device of FIG. 4;

FIG. 7 is a top plan view of the device of FIG. 5; and

FIG. 8 is a schematic view of a modified pressure measuring electric circuit suitably employed in conjunction with the devices of FIGS. 4 and 5.

Description of the preferred embodiments

Figure 1:
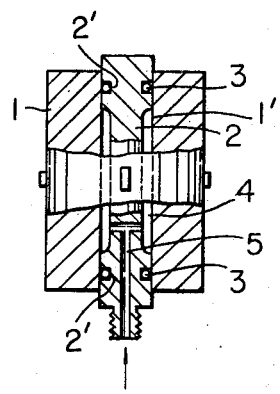
FIG. 1 is a fragmentary elevational view of the essential parts of a preferred form of device suitably employed for carrying out the novel method using one type of semiconductor element and which shows a portion thereof in section.
Figure 2:
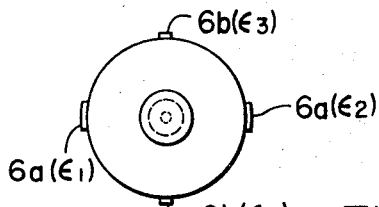
FIG. 2 is a plan view of the device of FIG. 1.

Now the present invention will be explained referring to FIGS. 1 and 2 of the drawings which illustrate a type of pressure sensitive vessels or devices each employing the same type of semiconductor elements or gauges. The pressure sensitive device shown in FIG. 1 comprises a cylindrical member 1 having a center bore 1', a core member 2 having a reduced diameter intermediate portion and inserted in the center bore 1' of the cylindrical member 1, and an annular pressure receiving chamber 4 defined by the reduced diameter intermediate portion of the core member 2 and the adjacent inner peripheral surface of the cylindrical member 1. Two vertically spaced annular packaging 3 and 3' are disposed in the correspondingly shaped notches 2' and 2' formed in the outer periphery of the core member 2 near the opposite ends of the core member so as to seal the outer periphery of the opposite end portions of the core member and the adjacent inner peripheral surface of the cylindrical member 1. The core member 2 has a T-shaped guide passage 5 in the lower portion theerof and the passage communicates at its upper horizontal portion with the pressure receiving chamber 4 and the lower end of the vertical portion of the groove 5 communicates with a suitable fluid supply source (not shown) whereby a pressurized fluid may be introduced from the supply source through the guide groove 5 into the pressure receiving chamber 4. Four rectangular semiconductor elements or gauges 6a, 6a, 6b and 6b are disposed in an equally spaced relation to each other in the outer periphery of cylindrical member 1. These semiconductor elements are of the same type (p-type or n-type) and as shown in FIG. 1, these semiconductor elements are grouped into two pairs, that is, the two semiconductor elements 6a and 6a constitute a first pair whilst the other two semiconductor elements 6b and 6b constitute a second pair. The first pair of elements 6a and 6a are disposed in directly opposite relation substantially in the center portion of the outer periphery of cylindrical member 1 in the vertical direction thereof with their longer axes extending at right angles to the axis of the cylindrical member 1 and the second pair of semiconductor elements 6b and 6b are also disposed in directly opposite relation in substantially the center portion of the outer periphery of cylindrical member 1 in the vertical direction thereof with their longer axes extending parallel to the axis of the cylindrical member.

The two pairs of semiconductor elements 6a, 6a and 6b, 6b are incorporated into the respective arms of a bridge circuit 7 shown in FIG. 5.

These semiconductor elements or gauges are so disposed that the two elements 6a and 6a of the first pair are incorporated into the first pair of parallel arms 7' and 7'' of the bridge circuit 7 whilst the other two elements 6b and 6b of the second pair are incorporated into the remaining pair of parallel arms 7''' and 7'''' of the bridge circuit 7. A suitable electric source 8 is connected between a first pair of opposite terminals of the circuit and a voltmeter 9 is connected between a second pair of terminals of the circuit. The above-mentioned two pairs of semiconductor elements are electrically connected to the electric source and voltmeter, respectively.

In the operation of the pressure sensitive device shown in FIG. 1, when a pressurized fluid is introduced from supply source through the T-shaped inlet means or groove 5 of the core member 2 into the annular pressure receiving chamber 4, the pressure on the fluid received within chamber 4 acts against the inner peripheral surface of cylindrical member 1 so as to cause circumferentially expansive strains $\epsilon 1$ and $\epsilon 2$ to develop in the outer periphery of cylindrical member 1. Since movement of the device is not limited in the axial direction thereof, compressive strains $\epsilon 3$ and $\epsilon 4$ are also caused to develop in the outer periphery of the cylindrical member. All of the expansive and compressive strains are detected by the pairs of semiconductor gauges or elements 6a, 6a and 6b, 6b and these elements convert their detected strains into electric quantities corresponding to the magnitudes of the strains. Now assuming that K is the thickness of the cylindrical member 1, E is the modulus of longitudinal elasticity of the cylindrical member, and $\nu$ is Poisson's ratio, P is the inner pressure of the cylindrical member, then relations between the inner pressure and the magnitudes of the strains $\epsilon 1$, $\epsilon 2$, $\epsilon 3$ and $\epsilon 4$ detected by the respective semiconductor elements 6a, 6a, 6b and 6b can be theoretically defined by the following formulae:

Circumferential strains—

$$\epsilon 1 = \epsilon 2 = \frac{2}{E(K_2 - 1)} P$$

Axial strains—

$$\epsilon 3 = \epsilon 4 = \frac{-2\mu}{E(K^2 - 1)} P$$

Figure 3:
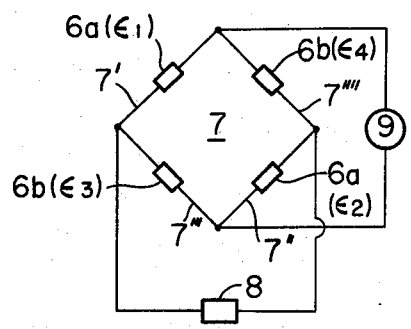
FIG. 3 is a schematic view of a pressure measuring electric circuit employed in conjunction with the types of devices of FIGS. 1 and 2.

Through many experiments it has been confirmed that the above theoretical values are the same as the results obtained in practice, and the strains determined by the bridge circuit 7 of FIG. 3 can be expressed by the following formula:

$$(\epsilon 1 + \epsilon 2) + (\epsilon 3 + \epsilon 4) = 2(\epsilon 1 - \epsilon 3) = \frac{4(1 + \mu)}{E(K^2 - 1)} P$$

Accordingly, if cylindrical member 1 is so designed that $(1+\nu)/E(K^2-1)$ will be an integer, the relations between the strains and fluid pressure will be a simple linear one. And if the cylindrical member 1 is so designed that $4(1+\nu)/E(K^2-1)$ will be 1, variations in the strain magnitudes themselves represent variations in the fluid pressure.

FIGS. 4 to 10 inclusive illustrate the cases in which combinations of p-type and n-type semiconductor elements are employed. The device shown in FIG. 4 comprises a hollow spherical member 20 having a fluid inlet or guide means at the bottom 21 which communicates at one end with a pressurized fluid supply source (not shown) and at the other end with the interior or pressure receiving chamber 20' of the spherical member 20. A first pair of rectangular p-type semiconductor gauges or elements 22p and 22p and a second pair of rectangular n-type semiconductor gauges or elements 22n and 22n are disposed in the outer spherical surface of the spherical member 20 near the top thereof. These semiconductor elements may be oriented in any desired directions.

The device shown in FIG. 5 comprises a hollow cylindrical member 23 having a pressurized fluid inlet or guide means 24 at the bottom which communicates at one end with a pressurized fluid supply source (not shown) and at the other end with the interior or pressure receiving chamber 23' of the cylindrical member 23. A first pair of p-type semiconductors 22p and 22p and a second pair of n-type semiconductors 22n and 22n are disposed vertically in substantially the center portion in the outer peripheral surface of the cylindrical member 23. All four of the semiconductor elements have the same rectangular shape and their longer axes are disposed at right angles to the axis of the cylindrical member 23.

The two different types of semiconductor elements 22p, 22p and 22n, 22n in two pairs of FIGS. 4 and 5 are incorporated in the respective arms of bridge circuit 25 of FIG. 10 in such a manner that the first pair of p-type semiconuctor elements 22p and 22p are incorporated into a first pair of two arms 25' and 25'' respectively whilst a second pair of n-type semiconductor elements 22n and 22n are incorporated into a second pair of two arms 25''' and 25'''' of the bridge circuit 25. A suitable electric source 26 is connected between a pair of opposite terminals and a voltmeter 27 is connected between the other pair of opposite terminals of the bridge circuit 25. The above-mentioned pairs of semiconductor elements 22p, 22p and 22n, 22n are electrically connected to electric source 26 and voltmeter 27 respectively.

In the operation of the spherical device shown in FIG. 4, the pressure P on the fluid which has been received in the pressure receiving chamber 20' acts against the inner spherical surface of the spherical member 20 so as to develop an even magnitude of expansive strain throughout the entire spherical surface of the spherical member 20 and the magnitude of the strains $\epsilon p$ and $\epsilon n$ detected by the four semiconductor elements 22p, 22p and 22n, 22n can be expressed by the following formula $$\epsilon p = \epsilon n = \frac{3(1-\nu)}{2E(K^2-1)} P$$

Since the increase or decrease in electric resistance due to variations in expansive strains in the oppositely postioned p-type and n-type semiconductor elements are the same when determined by bridge circuit 25, the same can be expressed by the following formula:

$$2\{\epsilon p - (-\epsilon n)\} = 2(\epsilon p + \epsilon n) = \frac{6(1-\mu)}{E(K^2-1)} P$$

and accordingly, the spherical member 20 is preferably so designed that $6(1-\nu)1E(K^2-1)$ will be 1 or any other integer.

In the operation of the cylindrical device of FIG. 7, the circumferential strains are expressed by the following formula:

$$\epsilon p = \epsilon n = \frac{2-\nu}{E(K^2-1)} P$$

and the strains determined by the bridge circuit 25 of FIG. 10 can be expressed by the following formula which is similar to the formula used for determining the strains in the device of FIG. 4, that is:

$$2\{\epsilon p - (-\epsilon n)\} = 2(\epsilon p + \epsilon n) = \frac{4(2-\nu)}{E(K^2-1)} P$$

and accordingly, the cylindrical member 23 is preferably so designed that $4(2-\nu)/E(K^2-1)$ will be 1 or any other integral.

It should, of course, be noted that when different types of semiconductor elements or gauges are employed in one system such elements having the same thermal properties must be selected.

While several embodiments of the invention have been shown and described in detail it will be understood that they are for the purpose of illustration only and are not to be taken as a definition of the scope of the invention.

I claim:

1. A fluid pressure measuring device comprising in combination: a vessel, said vessel being made of a material having a thickness, shape and tensile and a compressive elastic strength capable to withstand given limits of pressure strains; said vessel forming a pressure receiving symmetrical chamber with at least a portion of its wall symmetrically curved to provide equality of its actual strain-pressure relationship with its theoretically determined strain-pressure relationship, means to introduce fluid into said vessel under pressures within said given limits; means to detect the strain produced by the pressures of the introduced fluid, at least two semiconductor strain gauges spaced on the walls of said vessel to detect said strains as a resistance change, said vessel comprised of two cylindrical members located concentrically with both ends of the presective members sealed tightly together and thereby forming therebetween a cylindrical said pressure receiving chamber into which pressurized fluid may be introduced, said semiconductor gauges interconnected in a bridge circuit including an indicating instrument for indicating the pressure of the fluid in said cylindrcal chamber; the inner one of said cylindrical members being solid (2) save for supply passages passing therethrough, and the composition and configuration of the outer one (1) of said cylindrical members being such that $$\frac{1+\nu}{E(K^2-1)}$$

equals unity or an integral multiple thereof, where K is the thickness of the outer one of said cylindrical members, E is the modulus of longitudinal elasticity thereof, and $\nu$ is Poisson's ratio.

2. A fluid pressure measuring device comprising in combination:

a vessel, said vessel being made of a material having a thickness, shape and tensile and a compressive elastic strength capable to withstand given limits of pressure strains; said vessel forming a pressure receiving symmetrical chamber with at least a portion of its wall symmetrically curved to provide equality of its actual strain-pressure relationship with its theoretically determined strain-pressure relationship, means to introduce fluid into said vessel under pressures within said given limits; means to detect the strain produced by the pressures of the introduced fluid, at least two semiconductor strain gauges spaced on the walls of said vessel to detect said strains as a resistance change, said vessel comprising a first member and a second member, said first member and said second member being sealed together adjacent their ends and defining between them said pressure receiving chamber, said chamber taking the form of a hollow cylinder, both said first member and said second member being of uniform cross section between the planes tangent to the ends of said hollow cylinder except for the presence of supply members for supplying test fluid under pressure to said chamber, said first member being solid (2) save for supply passages passing therethrough, said gauges being affixed to said second member at points substantially equidistant from said planes tangent to the ends of said chamber.

3. A fluid pressure measuring device as claimed in claim 2 in which said gauges are equally spaced about said second member, a first pair of said gauges located at opposite sides of said second member having their long dimensions perpendicular to said planes tangent to the ends of said chamber, and a second pair of said gauges located at opposite sides of said outer member having their long dimensions parallel to said planes tangent to the ends of said chamber.

References Cited

UNITED STATES PATENTS

| | | | |
|---|---|---|---|
| 3,362,226 | 1/1968 | Yasunami | 73—398 |
| 2,398,372 | 4/1946 | Green | 73—398 |
| 2,942,219 | 6/1960 | McGrath | 73—398 XR |
| 3,149,488 | 9/1964 | Castro | 73—141 |
| 3,244,006 | 4/1966 | Delmonte | 73—398 |
| 3,273,400 | 9/1966 | Pastan | 73—398 |
| 3,358,501 | 12/1967 | Ormono | 73—141 |

DONALD O. WOODIEL, Primary Examiner